United States Patent [19]
Liebert

[11] Patent Number: 5,383,675
[45] Date of Patent: Jan. 24, 1995

[54] DRIVE AND CONTROL MECHANISMS FOR HUMAN POWERED VEHICLES

[76] Inventor: Richard T. Liebert, 12 Kristen Dr., Ballston Spa, N.Y. 12020

[21] Appl. No.: 273,267

[22] Filed: Jul. 11, 1994

Related U.S. Application Data

[63] Continuation of Ser. No. 733,380, Jul. 22, 1991, abandoned, which is a continuation-in-part of Ser. No. 517,200, May 1, 1990, abandoned.

[51] Int. Cl.⁶ .................. B62K 21/00; B62M 1/12; B62M 3/00; B63H 25/02
[52] U.S. Cl. .................. 280/266; 114/144 R; 114/363; 244/222; 280/233; 280/234; 280/235; 280/282; 280/288.1; 440/21
[58] Field of Search ............... 280/233, 235, 244, 247, 280/252, 253, 259, 261, 266, 282, 288.1, 234; 440/21; 114/144 R; 244/222

[56] References Cited

U.S. PATENT DOCUMENTS

| | | | |
|---|---|---|---|
| 90,837 | 6/1869 | Guild | 280/233 |
| 115,212 | 5/1871 | Janson | 280/233 |
| 471,770 | 3/1892 | Miller | 280/233 |
| 564,796 | 7/1896 | Long et al. | 280/233 |
| 585,370 | 6/1897 | Trickler | 280/235 |
| 627,680 | 6/1899 | Brock | 280/235 |
| 1,503,878 | 8/1924 | Brady | 280/247 |
| 3,429,584 | 2/1969 | Hendricks | 280/281 |
| 3,981,516 | 9/1976 | Häggkvist | 280/263 |
| 4,152,005 | 5/1979 | Vanore | 280/234 |
| 4,180,280 | 12/1979 | Doveri | 280/277 |
| 4,189,166 | 2/1980 | Lindsey | 280/234 |
| 4,198,072 | 4/1980 | Hopkins | 280/267 |
| 4,248,448 | 2/1981 | Dmitrowsky | 280/261 |
| 4,279,429 | 7/1981 | Hopkins et al. | 280/267 |
| 4,303,256 | 12/1981 | Mortensen | 280/261 |
| 4,349,340 | 9/1982 | Hoffmann | 440/30 |
| 4,373,740 | 2/1983 | Hendrix | 280/269 |
| 4,469,343 | 9/1984 | Weatherford | 280/281 |
| 4,548,421 | 10/1985 | Wiener | 280/267 |
| 4,639,007 | 1/1987 | Lawrence | 280/244 |
| 4,700,648 | 10/1987 | Trefethern et al. | 114/363 |
| 4,795,381 | 1/1989 | Willems | 440/21 |
| 5,069,469 | 12/1991 | Rosengrant et al. | 280/261 |

FOREIGN PATENT DOCUMENTS

13544 of 1896 United Kingdom ............... 280/233

*Primary Examiner*—Mitchell J. Hill
*Attorney, Agent, or Firm*—Schmeiser, Morelle & Watts

[57] ABSTRACT

A human powered mechanism for propelling a wheeled land vehicle, a water vehicle (a boat or hydroplane) using either a water screw or a jet of water or an ultralight aircraft with an air screw. The mechanism can utilize either arm or leg muscles or preferably, both arms and legs extending and retracting in a manner similar to walking or running as performed from a semi-recumbent position. Steering or other critical control is accomplished through another mechanism which is guided by the appropriate movement of the operator's head. The operators feet are placed on pedals which are attached to swinging members which pivot in a bearing at the upper end. The operator's hands grasp leverage arms which are cantilevered, the distal ends of which are attached to the same push-pull connecting rods as the above mentioned swinging members with foot pedals attached.

7 Claims, 19 Drawing Sheets

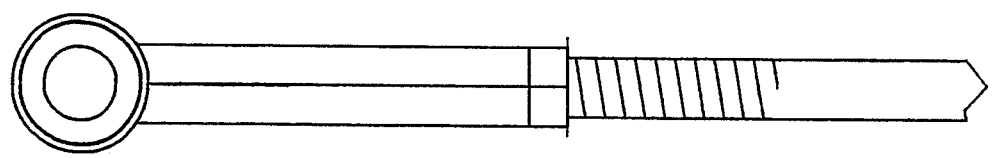
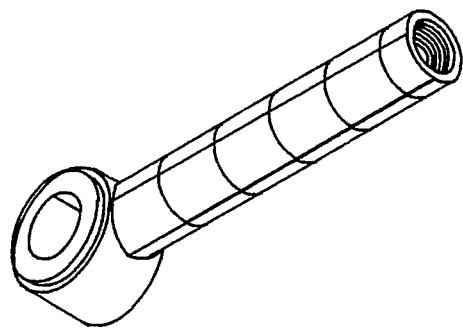
FIG. 3a
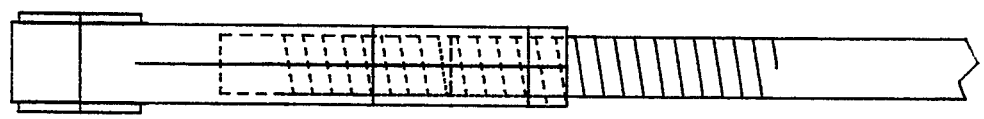

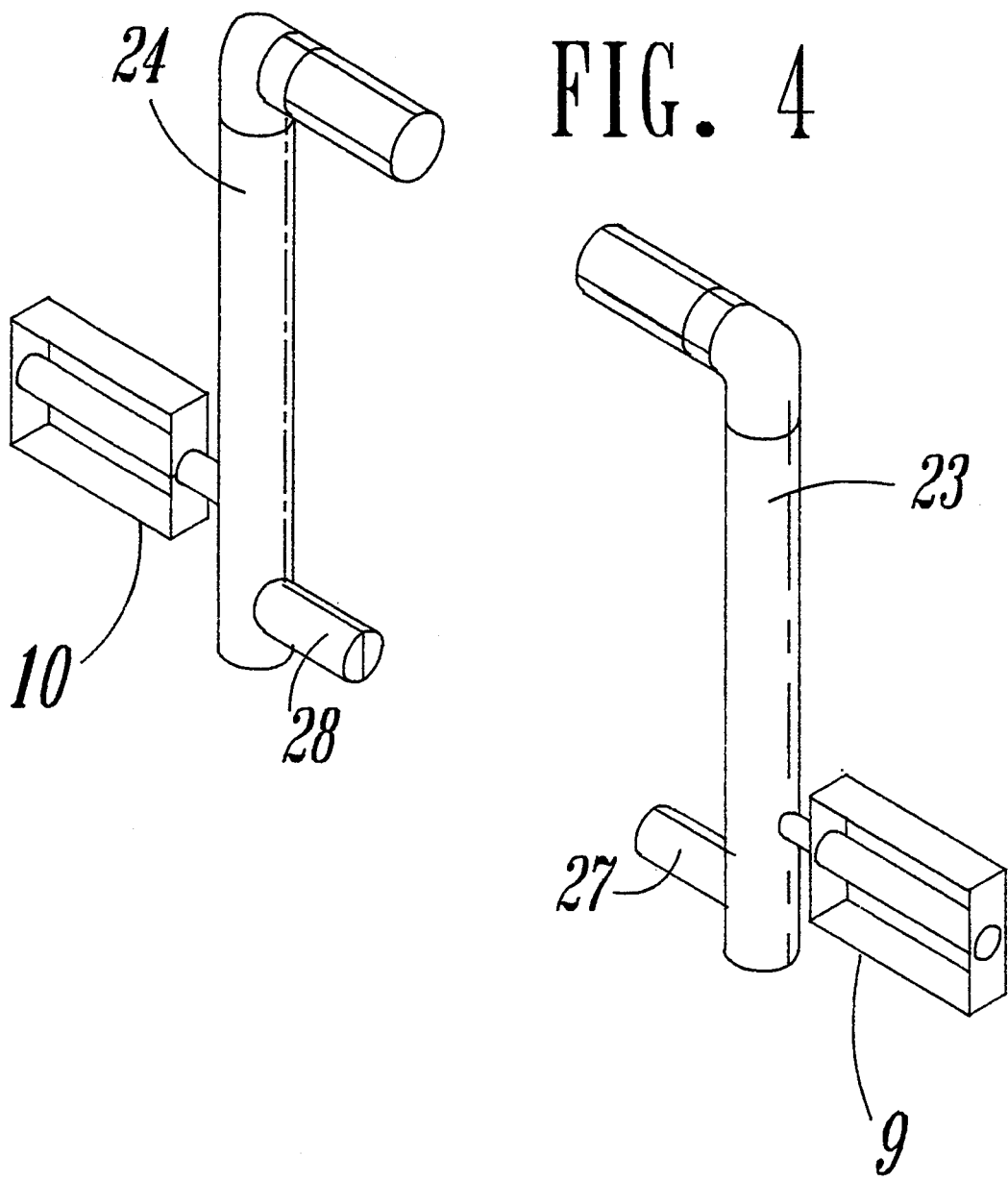

DRIVE AND CONTROL MECHANISMS FOR HUMAN POWERED VEHICLES

This application is a continuation of application Ser. No. 07/733,380, filed Jul. 22, 1991, now abandoned, which is a continuation-in-part of application Ser. No. 07/517,200, filed May 1, 1990, abandoned.

BACKGROUND OF THE INVENTION

1. Field of the Invention

The invention relates to the design and use of muscle powered mechanisms useful for land, water and air vehicles of foot pedal and hand lever design.

2. Information Disclosure Statement

It is realized that human powered vehicles such as bicycles, tricycles and to a lesser extent, recumbent vehicles are popular and in wide use. These each offer the operator an economical means of transportation and represent a good form of exercise. Some inventions in the past have been filed for vehicles and mechanisms that could be propelled solely by the muscle power of the operator or operators which provide more comfort, a lower center of gravity, and more efficient utilization of the operator's muscle strength than a conventional bicycle. These were typically recumbent vehicles. The demand for land vehicles of this genre has, to date, remained relatively low in comparison to bicycles as there has not been a clear advantage in their use. The disadvantages of some of the recumbent vehicles are complexity of design, weight, cost and the degree of difficulty to operate them. There are also patents for recumbent water vehicles in which a pedal crank drive rotates an air or water screw. However, none of these mechanisms has gained a clear advantage over a bicycle by deriving motive force from both arm and leg muscles in an efficient and natural arm and leg movement manner. Further, most of earlier concepts do not address use by the physically handicapped. Applicant is aware of the prior patents listed below disclosing arm and leg drive systems and recumbent vehicles:

| U.S. PAT. NO. | PATENTEE |
|---|---|
| 3,429,584 | Hendricks |
| 3,981,516 | Haggkvist |
| 4,152,005 | Vanore |
| 4,180,280 | Doveri |
| 4,189,166 | Lindsey |
| 4,198,072 | Hopkins |
| 4,248,448 | Dmitrowsky |
| 4,279,429 | Hopkins et al |
| 4,303,256 | Mortenson |
| 4,349,340 | Hoffmann |
| 4,373,740 | Hendrix |
| 4,469,343 | Weatherford |
| 4,548,420 | Patroni, Jr. |

Purposes of the present invention are to demonstrate clear advantages over a bicycle and various other prior arts with a mechanism of novel design and at the same time avoid the drawbacks experienced in other recumbents. The ideal vehicle mechanism will efficiently utilize a non-handicapped operators arm and leg strength and represent a balanced form of exercise for the upper torso and legs of the operator. The same vehicle may also lend itself to use by physically impaired individuals who have limited or no use of either their arms or their legs. The ideal human powered vehicle mechanism would also be light in weight yet durable, uncomplicated, easy to use, of modest cost and have adjustable linkages, controls and seat to accommodate operators of varying proportions. Additionally, foot elevation should be maintained low enough to avoid fatigue and help the operator maintain adequate circulation.

With respect to the aforesaid purposes, applicant also takes note herein of patents issued to Brock (U.S. Pat. No. 627,680), Grant (British No. 13,544), Long et al. (U.S. Pat. No. 564,796), Miller (U.S. Pat. No. 471,770) and Trickler (U.S. Pat. No. 585,370). Brock teaches a driving and steering mechanism for velocipedes that accomplishes steering by partly pivoting the seat (pelvic thrust) and by partly manipulating a single lever connected to a driving crank. Grant manipulates a pair of levers that provide auxiliary cranking power to petal cranks, while Long et al. employ conventional steering and hand levers to provide prime and/or auxiliary power. The aforementioned are directed primarily to motivational systems and do not contemplate head or torso steering as do Miller or Trickler. The latter two patentees inculcate systems which move but in two planes and effect steering therein by twisting of the operator's head to cause a yaw (left-right) moment about a vertical shaft yoked to a single front steering wheel axle. The common thread of steering motion in all aforesaid systems is that of motion about the yaw (vertical) axis. None appear to teach motion acquisition about the roll (longitudinal) axis and, after an exhaustive search of the velocipede and aircraft art, applicant found no teaching of steering, solely by using the head, which effected rotation about all axes—yaw, roll and pitch (lateral or transverse axis). The latter is self-evident because none of the prior art addresses three-dimensional travel such as performed by aircraft.

SUMMARY OF THE INVENTION

Surprisingly, the scope of capabilities included in the design and use of the present invention demonstrates clear advantages over the prior arts. The mechanism, while useful for land, water and air vehicles is for description purposes, described in use on a semi-recumbent velocipede.

The present invention makes efficient use of the operator's arm and leg strength through cantilevered leverage arms and foot pedals mounted on a set of motive members. The cantilevered leverage arms are push-pull motive members operated by the rider's hand and arm movements. Through a push-pull connecting rod each cantilevered leverage arm is synchronized with another motive member on which a pedal is mounted that swings forward when force is applied and back when the force is removed which was a design feature of the mechanism. Each of the members to which a pedal is attached and each of the cantilevered leverage arms is in communication with one another through a connecting rod. As the mechanism was designed, when the operator's right arm is retracted while grasping the right cantilevered leverage arm, the right leg of the operator is extended applying pressure to the pedal of the right side swinging motive member. At the same instant, the operator's left arm is extended while grasping the left cantilevered leverage arm and left leg retracted, which is the opposite state of extension and retraction of the operators right side. This configuration of motive force members results in an increase of motive force delivered to the rear wheel equal to the strength of the operator's arms. The drive mechanisms are in continuous synchronization through constant communication with eccentrics varied by 180° of rotation and on opposite sides of a chain sprocket, a double crank as used on a bicycle. The chain fitted about the driving sprocket may, as in the case of a velocipede, rotate a rear driven sprocket and a driven wheel. The chain and sprocket assemblies may utilize drive ratio changing devices as known to the science, such as derailleurs and multiple sprockets.

It is also an object of the present invention to allow the rider an operating movement as similar to a walking or running motion as possible and still maintain efficient use of the motive force generated. An intent of the present invention was to match the motion of a human's arms relative to his or her legs where the arms are swinging in opposite directions relative the legs.

Perhaps the most significant aspect of the present invention is the means for critical control of the vehicle, steering in the case of a velocipede. The operator adjusts the steering linkage by the appropriate movement of his or her head and upper torso. The operator's head or helmet pushes a leverage segment of the linkage to either the left or right. The left or right movement is communicated to an inverted "T" portion of the linkage through a bearing mounted, or other low resistance means, vertical shaft. The inverted "T" portion of the linkage is located such that it will not interfere with the drive mechanisms. In a neutral steering position each side of the inverted "T" points toward either the left or right side of the vehicle. At equidistant points from the center or pivoting point on the horizontal portion of the "T", a cable and spring combination is attached to each side. The purpose of the cable is to communicate the operator's head movement with steering linkage located at the front of the velocipede which like the inverted "T" also pivots on a vertically oriented axis and is bearing mounted. The springs are used in conjunction with the cables to absorb shock that otherwise would be transferred to the operator's head. The forward mounted pivot point regenerates the rotational motion of the vertical shaft and inverted "T". The relationship between the two pivot points can utilize varying degrees of mechanical advantage depending on the steering characteristics desired. The forward pivot point again translates its rotational motion into a directional motion through a rearwardly extending tab which through the use of a clevis or tie rod end, communicates with a tie rod, one for each the right and left side. At the distal end of each tie rod is a steering knuckle which is in communication with the tie rod through another clevis or tie rod end. A wheel is mounted on the axle portion of the steering knuckle and responds by pivoting to the directional movement of the tie rods.

The mechanism can be used by physically disabled. Because the drive mechanism can be operated with either the operator's arms or legs or both arms and legs, persons that have lost use of either set of limbs or varying combinations may also experience the freedom of a "bike" ride. As steering control is operated by the appropriate movement of the operator's head, the loss of the use of one or two limbs is inconsequential.

The present invention affords an excellent means of exercise using upper torso as well as legs. When the present invention is powered by the operator's arms and legs, a balanced form of exercise results. Major muscle groups of the upper torso are now exercised when using the present invention in addition to the legs and buttocks, furnishing a superior form of exercise when compared to a bicycle.

An economical substitute for an automobile which because of speeds possible could be used for errands normally run in an automobile or even enjoyable site seeing. Because the present invention is muscle powered, it does not need to be filled with a fuel, is non-polluting and therefore an environmentally safe method of transportation.

BRIEF DESCRIPTION OF THE DRAWINGS

FIG. 3a shows three different views of a rod end bearing which is used to connect portions of the drive mechanism.

FIG. 4 is an exploded view of the swinging motive members, pedals and horizontal pins.

DETAILED DESCRIPTION OF A PREFERRED EMBODIMENT

Figure 1:
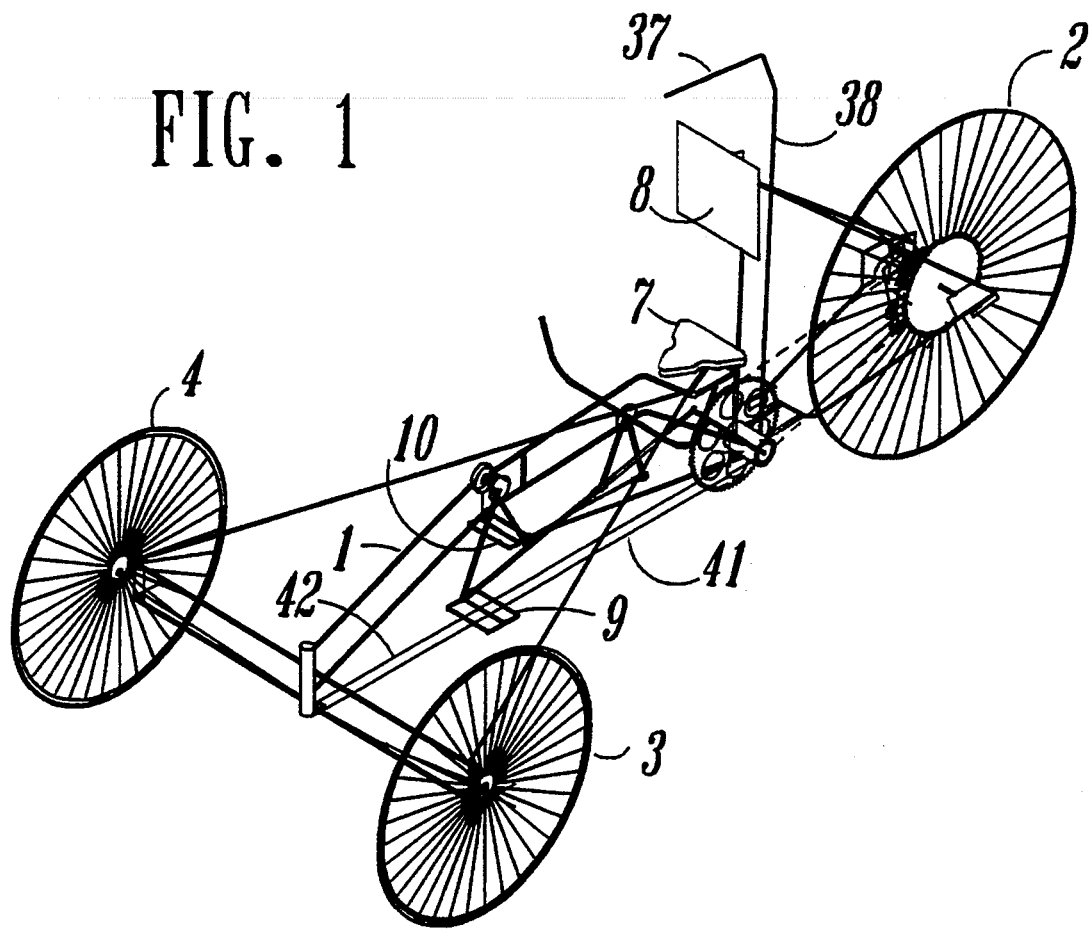
FIG. 1 is a perspective view of a recumbant velocipede in accordance with the present invention.
Figure 2:
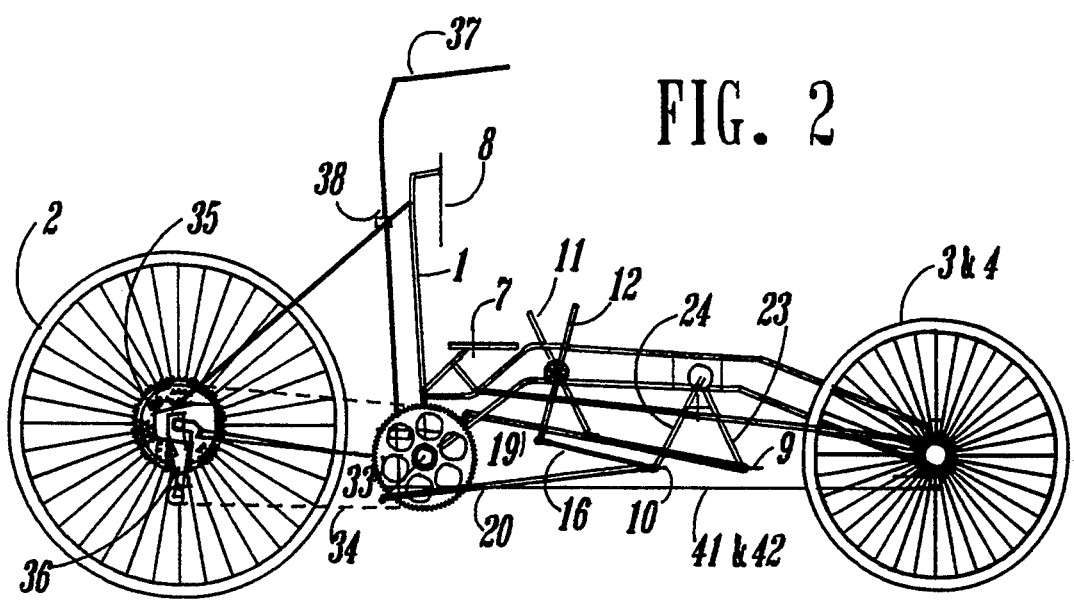
FIG. 2 is a side view of the recumbant vehicle shown in FIG. 1.
Figure 3:
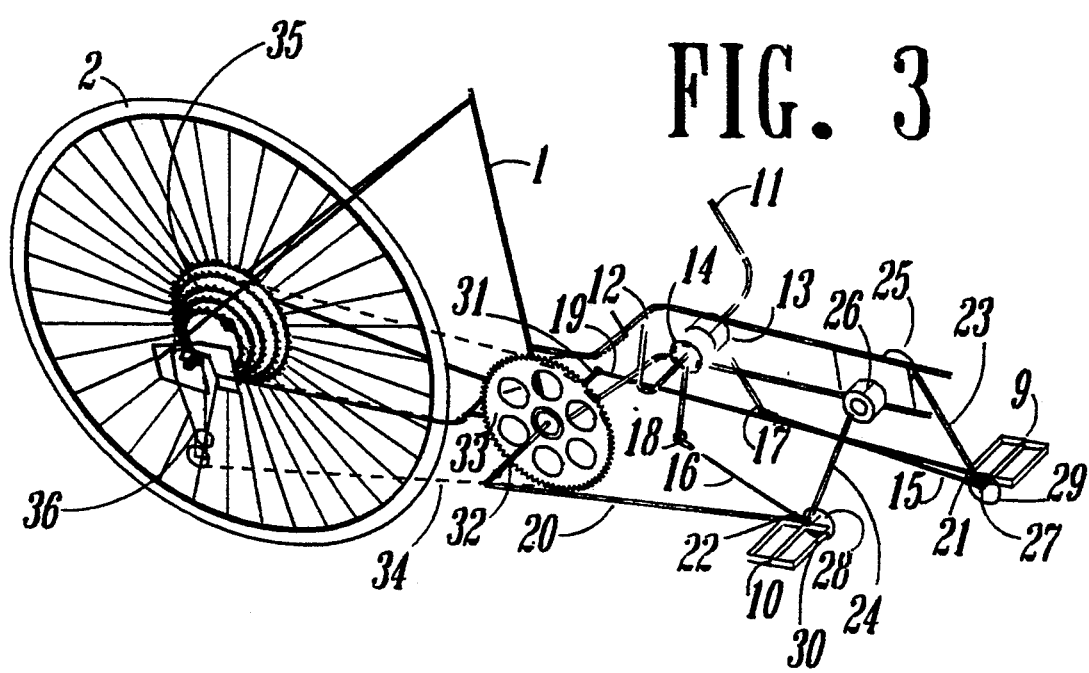
FIG. 3 is a perspective view of the drive mechanism the drive wheel and part of the velocipede frame.
Figure 5:
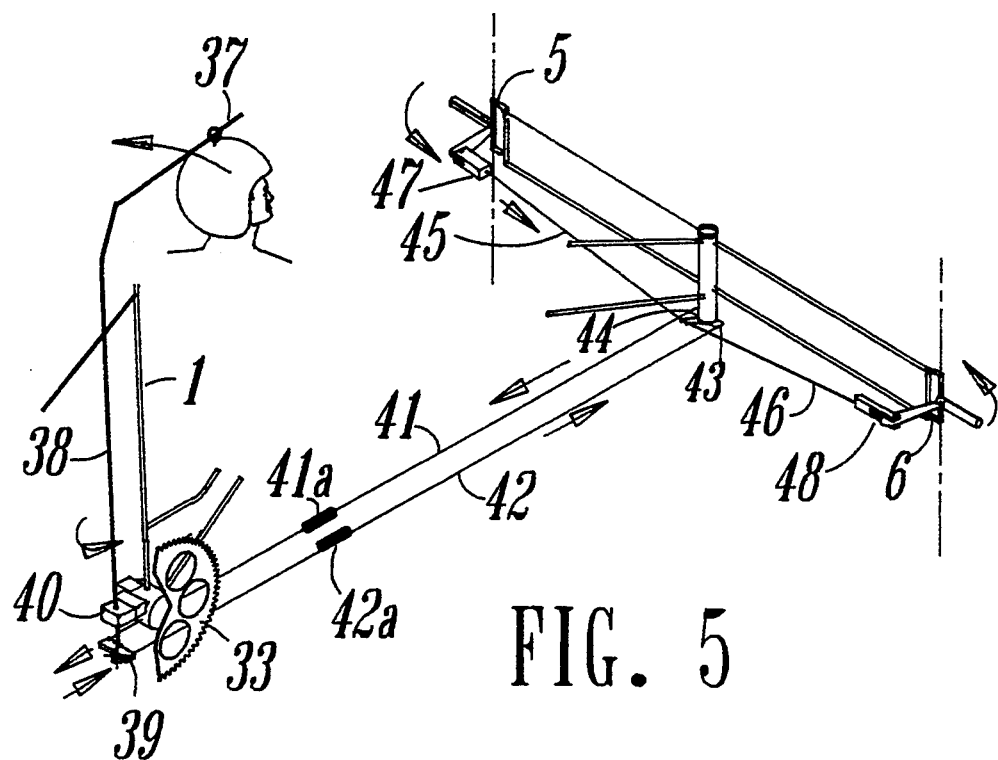
FIG. 5 is a perspective view of the steering mechanism with most of the drive edited out and part of the frame removed which indicates the expected movement when the operator attempts a left turn.
Figure 7:
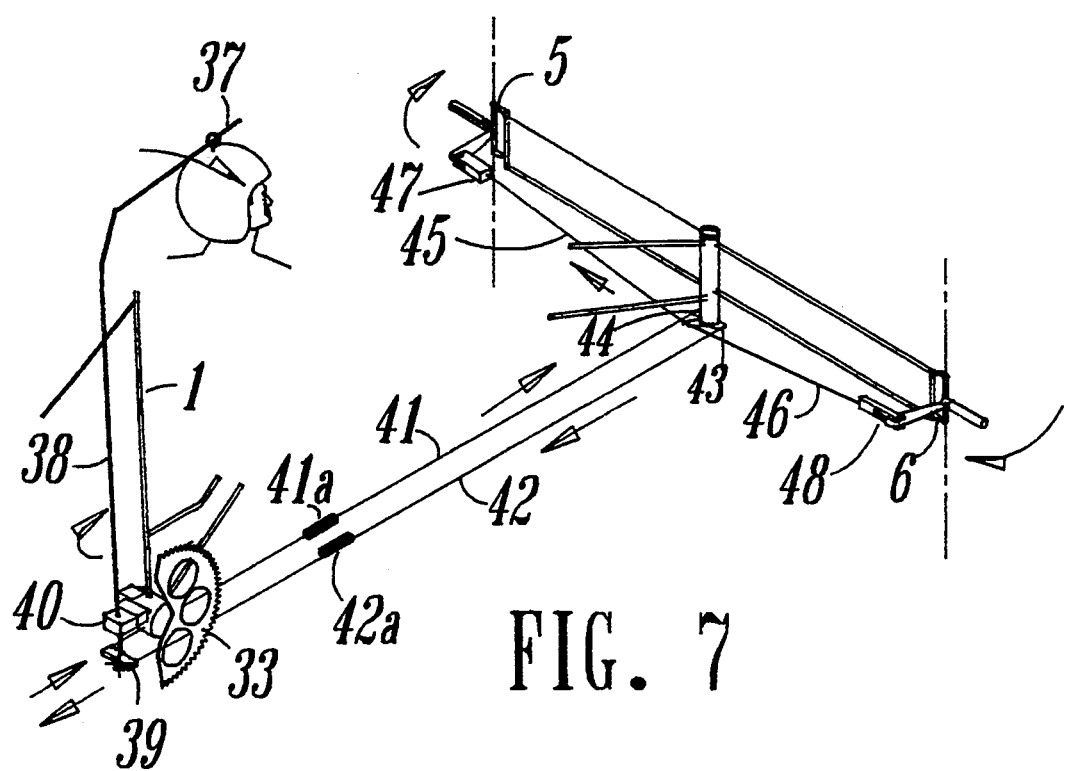
FIG. 7 is a perspective view of the steering mechanism with most of the drive edited out and part of the frame removed which indicates the expected movement when the operator attempts a right turn.

The mechanisms that drive and steer the velocipede are shown in FIGS. 1 and 2 as completely assembled on a frame 1 constructed from a rigid yet light weight material such as metal tubing, composites or plastics of adequate tensile and compressive strength. The frame 1 extends from a drive wheel 2 mounted at the rear of the vehicle to the left and right front wheels 3 and 4 which are pivotally mounted as shown in FIGS. 5 and 7 on left and right steering knuckles 5 and 6 at the front of the vehicle which in turn are affixed to the frame 1. As seen in FIGS. 1 and 3 a seat 7 is mounted on the frame i slightly forward of the drive wheel 2 and high enough such that the drive mechanism will not contact said seat 7. The position of the seat 7 is at an elevation which allows the operator to maintain a recumbent or semi-recumbent position that lowers the center of gravity and also efficiently utilizes leg muscle strength. A back rest S, which is mounted on a vertical portion of the frame 1, gives the operator a surface to push his or her back against while legs are alternately pressing on the left or right foot pedals 9 and 10.

Motive force for the drive mechanisms is derived from the muscle strength of the operator's arms, the operator's legs or the muscles of both arms and legs. Referring to FIG. 3, which for the clarity of explanation, portions of the vehicle not related to the drive mechanisms and their physical support have been removed. The operator of the vehicle can apply motive force through the left and right foot pedals 9 and 10 and through the left and right cantilevered leverage arms 11 and 12 which are push pull operated. The cantilevered leverage arms 11 and 12 each pivot on a bearing, 13 the left bearing and 14 the right bearing. Located at the bottom end of each cantilevered leverage arm 11 and 12, a push-pull connecting rod 15 and 16 pivotally interfaces through, as shown in expanded isolation FIG. 3a and the locations shown in FIG. 3, the use of a rod end bearing 17 and 18. The push-pull connecting rods 15 and 16 each communicate with a reciprocal to rotational connecting rod 19 and 20 through another rod end bearing 21 and 22 at the rod end opposite the cantilevered leverage arms 11 and 12. The length of the push-pull connecting rods 15 and 16 may be adjusted by screwing in, clockwise rotation, or out, counter clockwise rotation, the rod end bearings 15, 16, 21 and 22. Motive force generated by the cantilevered leverage arms 11 and 12 is relayed to left and right swinging motive members 23 and 24 to which the pedals 9 and 10 are attached. Each of the swinging motive members pivot at their upper end in bearings 25 and 26 which are affixed to the frame 1. The reciprocal to rotational connecting rods 19 and 20 pivotally communicate with the swinging motive members 23 and 24 at a horizontal pin 27 and 28, shown clearly in FIG. 4, affixed to the lower end of each swinging motive member 23 and 24 bearings 29 and 30 mounted on the forward end of the reciprocal to rotational connecting rods 19 and 20. The reciprocal to rotational connecting rods 19 and 20 represent the motive force connection from the drive mechanisms of the present invention to the forward sprocket assembly eccentrics 31 and 32 which are affixed on opposite sides and at 180° rotational difference in their position relative to each other. The purpose of the eccentrics 31 and 32 are to convert reciprocating motion into rotational motion. As a result of the conversion in the form of the motion, reciprocating to rotational, the eccentrics 31 and 32 turn a chain sprocket or sprocket assembly 33, which is rotatably mounted in the frame 1 and of the type typically used on a bicycle. The sprocket 33 meshes with a drive chain 34, known to the science as a bicycle chain. In turn the drive chain meshes with a driven sprocket assembly 35 which may work in conjunction with a derailleur 36 which is used for changing the ratio of driving sprocket assembly 33 to driven sprocket assembly 35. As with a bicycle, the driven sprocket assembly 35 imparts rotational energy to the drive wheel 2 through an oriented ratchet engaging when the driven sprocket assembly 35 is turned sufficiently fast enough in a forward direction. The drive wheel 2 as shown in FIGS. 1, 2 and 3 is rotatably mounted within a connecting fork at the rear of the frame 1.

Motive force is efficiently applied to the drive mechanism of the vehicle by the operator. When the right cantilevered leverage arm 12 is pulled back, the right pedal 10 is pushed forward. Simultaneously, the operator's left arm and leg are in an opposite state of extension and retraction where the left cantilevered leverage arm 11 is pushed forward and the left pedal 9 is allowed to swing rearward. If foot straps for the pedals 9 and 10 are utilized, leg muscle strength can aid in the rearward swing of the pedals 9 and 10. As well understood in the art of kinesiology, greater human effort, i.e., muscular output and efficiency, is gained when an arm and leg on one side of the body are in retraction and extension, respectively. If, for example, some restraint, as disclosed above and in the drawings, is placed between the oppositely stressed arm and leg muscles (say, held in/by the respective hand and foot), much greater overall effort could be accomplished (in the average) than if the arm and leg were to merely reciprocate first in one direction, then in the other. The cumulative motive force imparted by the operator's arms and legs is transferred to the left and right sprocket assembly eccentrics 31 and 32 through the left and right reciprocal to rotational connecting rods 19 and 20. The motive force is then transferred to the drive wheel 2 in the same manner as is typically used with a bicycle of single or multiple sprocket ratios.

Figure 6:
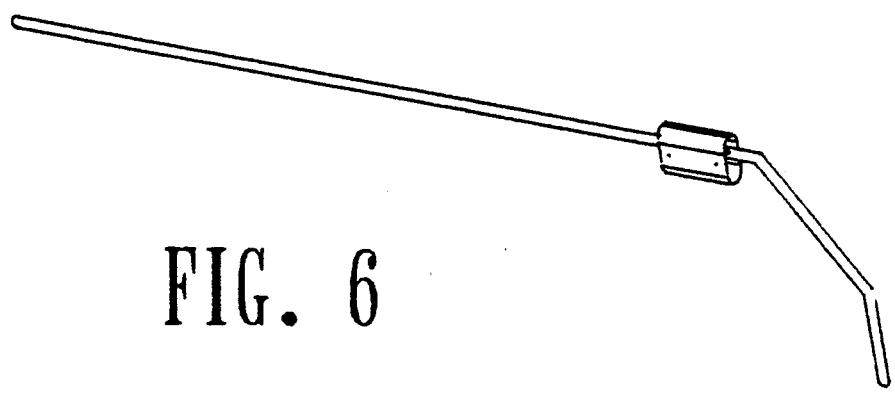
FIG. 6 is an exploded view of two variations in the steering levers.
Figure 6A:
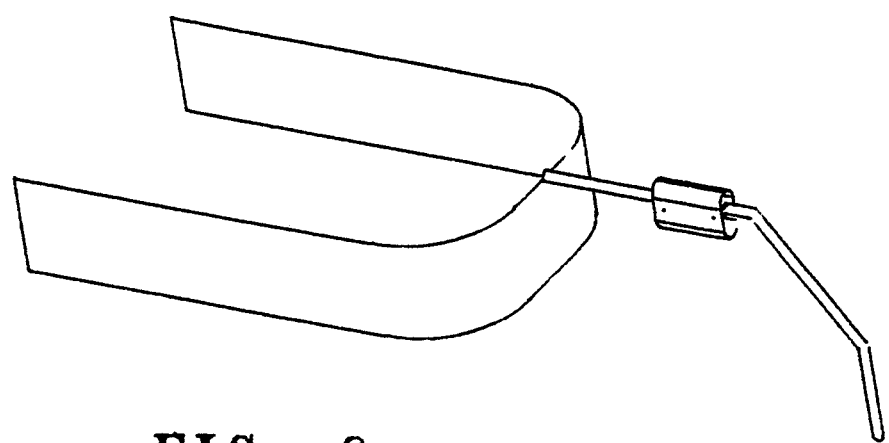
Figure 13A:
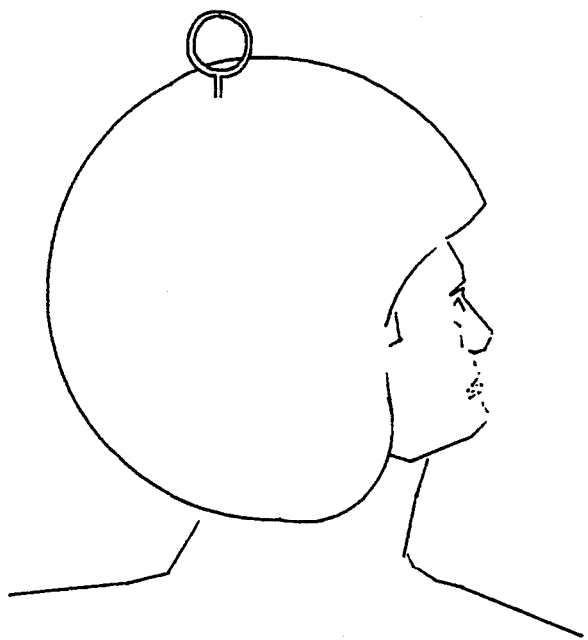
FIGS. 13a, b, and c shows two different control helmets, one is a simple control helmet for use with a land vehicle or water craft and the other two represent different views of a helmet configuration needed for an aircraft.
Figure 13B:
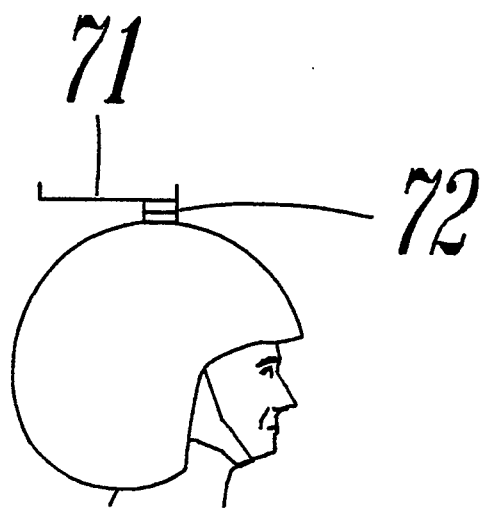
Figure 13C:
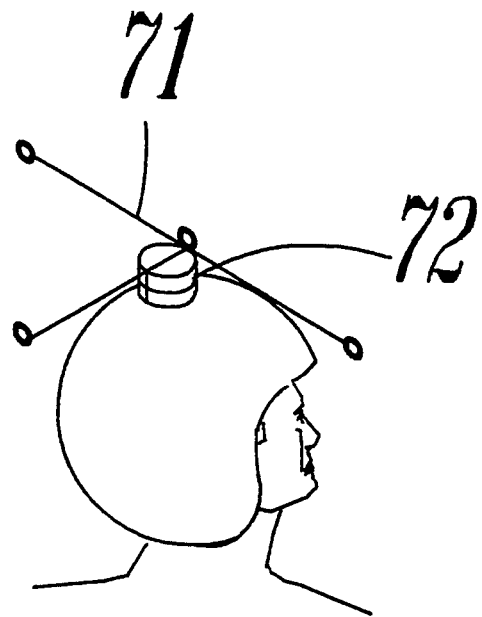

Critical control of the vehicle, steering in the example of a velocipede, is accomplished by the appropriate movement of the operator's head or head and upper torso. Reference is made to FIGS. 5 and 7 which for clarity of explanation, all of the drive mechanism, with the exception of a portion of the drive sprocket 33, portions of the frame 1 and both of the front wheels 3 and 4 have been removed from the drawing. The appropriate movement necessary for a left turn can be accomplished by the operator's head or head and upper torso moving the steering lever 37 to the left. Communication of operator of the vehicle with the steering lever 37 is made as shown in FIG. 13 through a helmet fitted with an "eye bolt" or other enclosing attachment fitted to the helmet. The steering lever 37 may also be of a "Y" or "Fork" configuration FIG. 6 which cradles the operator's head or neck thereby permitting use without a helmet. A vertical acting hinge may also be incorporated in the steering lever 37 to allow for variation in elevation do to the turning radius formed by the operator's head or head and upper torso when moving from side to side making turns and/or to accommodate operator's of different proportions. The steering lever 37 of FIG. 5 is adjustably mounted within and then pinned or bolted to a vertical steering rod 38. The turning motion of the steering lever 37 is communicated to an inverted "T" 39 affixed at the bottom end of the vertical steering rod 38. The steering rod 38 pivots within a bearing 40 which is mounted on the frame 1. The inverted "T" 39 is located in a position such that it will not interfere with the drive mechanism. In a neutral steering position one side of the inverted "T" 39 points directly left while the other side points directly right. At equidistant points from the center or pivoting point on the horizontal portion of the inverted "T" 39, a steering spring 41a and 42a and cable 41 and 42 are mounted. In a left turn the left steering spring 41a and cable 41 are pulled rearward while the right steering spring 42a and cable 42 are allowed to move forward. The opposite end of each steering spring 41a and 42a and cable 41 and 42 is attached under tension to a piece of linkage which is described as a forward inverted "T" 43 and pitman arm 44 which also pivots on a vertically oriented axis and is bearing mounted on the frame 1. In response to the left steering spring 41a and cable 41 moving rearward and the right steering spring 42a and cable 42 moving forward, the left side of the forward inverted "T" 43 moves rearward and the right side forward. The rearwardly extending pitman arm 44 which is affixed to the center of the forward inverted "T" rotates to the right, or counterclockwise. Pivotally attached to the pitman arm 44 are a left tie rod 45 and a right tie rod 46. As the pitman arm 44 rotates to the right it pulls the left tie rod 45 and pushes the right tie rod 46. The left tie rod 45 pivotally communicates with the left steering knuckle 5 through the left tie rod end 47 and the right tie rod 46 pivotally communicates with the right steering knuckle through the right tie rod end 48. The steering movement initiated at the steering lever 37 is communicated to the steering knuckles producing a left turn while the vehicle is moving in a forward direction. A turn to the right is accomplished by the steering components moving in the opposite direction as shown in FIG. 7.

The use of a spring 41 and 42a 41a and 42a in each steering cable 41 and 42 was implemented to absorb shock in the event one of the front wheels hit a hole or an obstacle and thereby lessen the potential for injury to the operator. A threaded connection on each of the tie rod ends 47 and 48 allow for toe-in adjustment of the front wheels 3 and 4. Castor is varied to suit the operator by mounting each of the steering knuckles 5 and 6 in the pair of holes which produces the desired characteristics. Camber adjustments can be made with shims between steering knuckles 5 and 6 and the frame 1.

Brakes for the vehicle are known to the science as caliper brakes, center or side pull, and do not represent a novel means of stopping. Brakes for the present invention should be used on the rear drive wheel 2 to avoid potential steering problems.

Drive ratio variation is changed through the use of commercially available derailleurs 36 which move the drive chain 34 to different sprockets 33 and 35. These also represent old science and do not represent a novel means of changing drive ratios.

Figure 8:
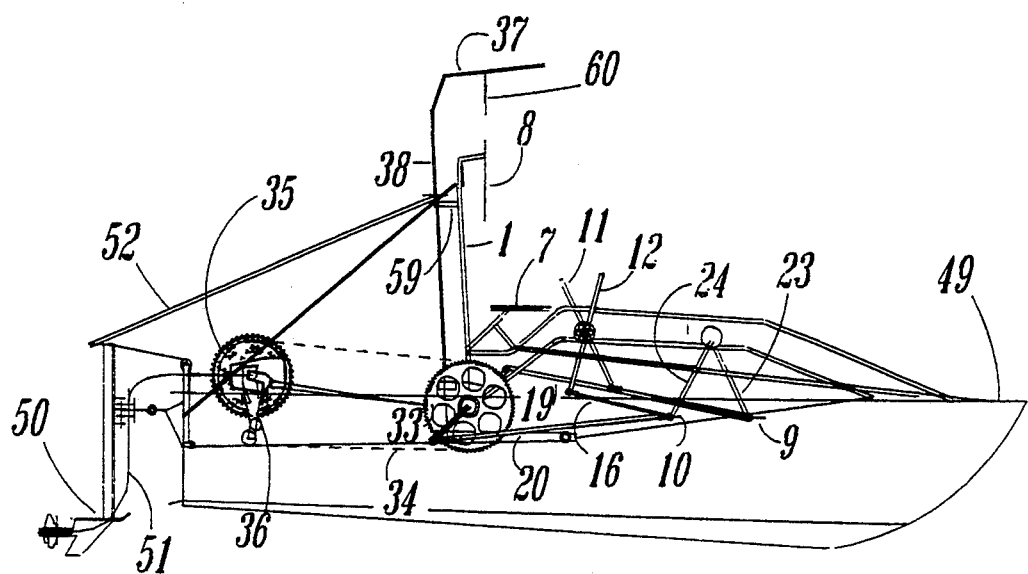
FIG. 8 is a side view of the drive and control mechanisms as they might be used in water craft.
Figure 9:
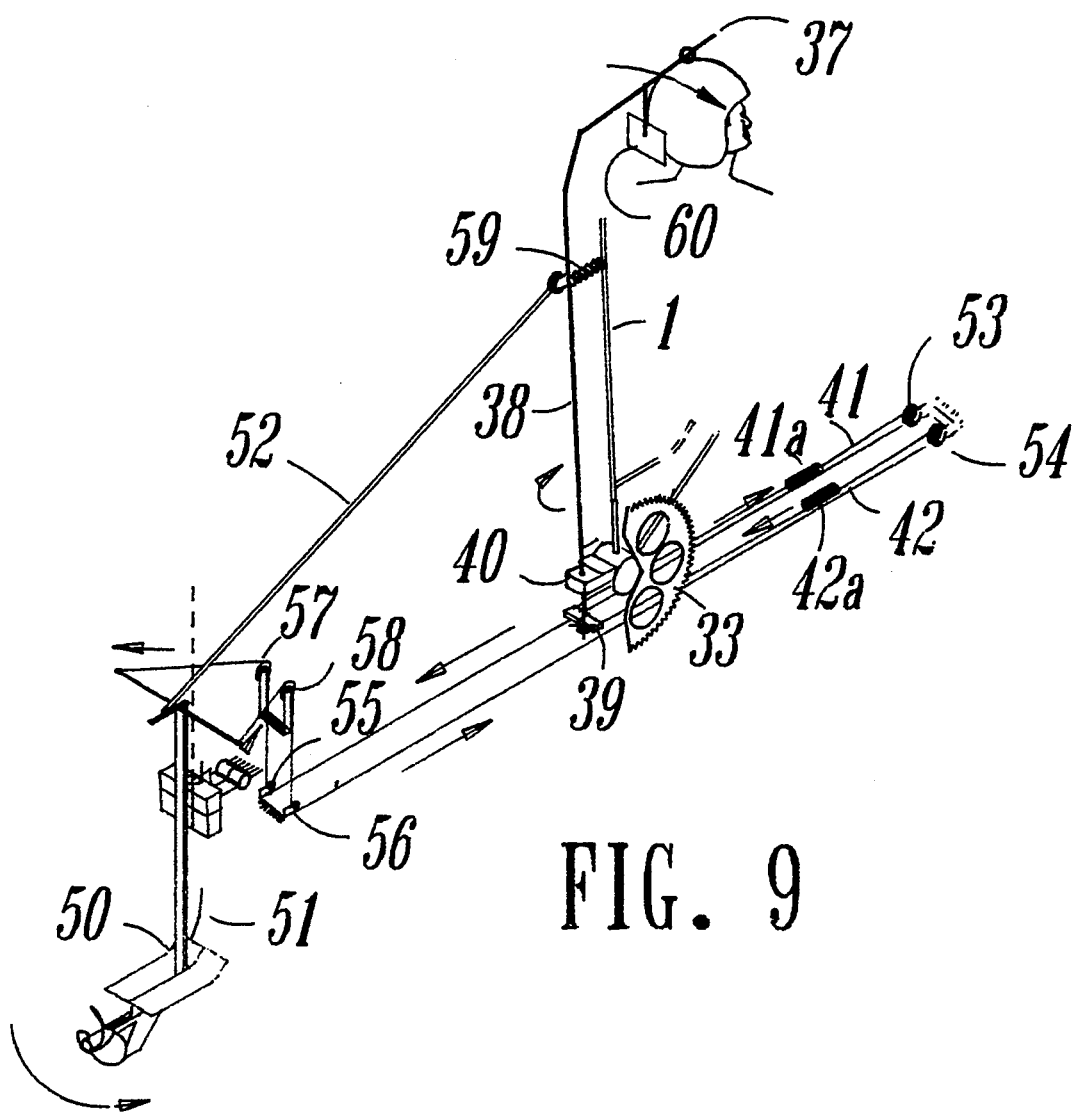
FIG. 9 is a perspective view of the control mechanisms for steering and trim adjustment as applied to a water craft showing the expected movement when the operator attempts a right turn.
Figure 10:
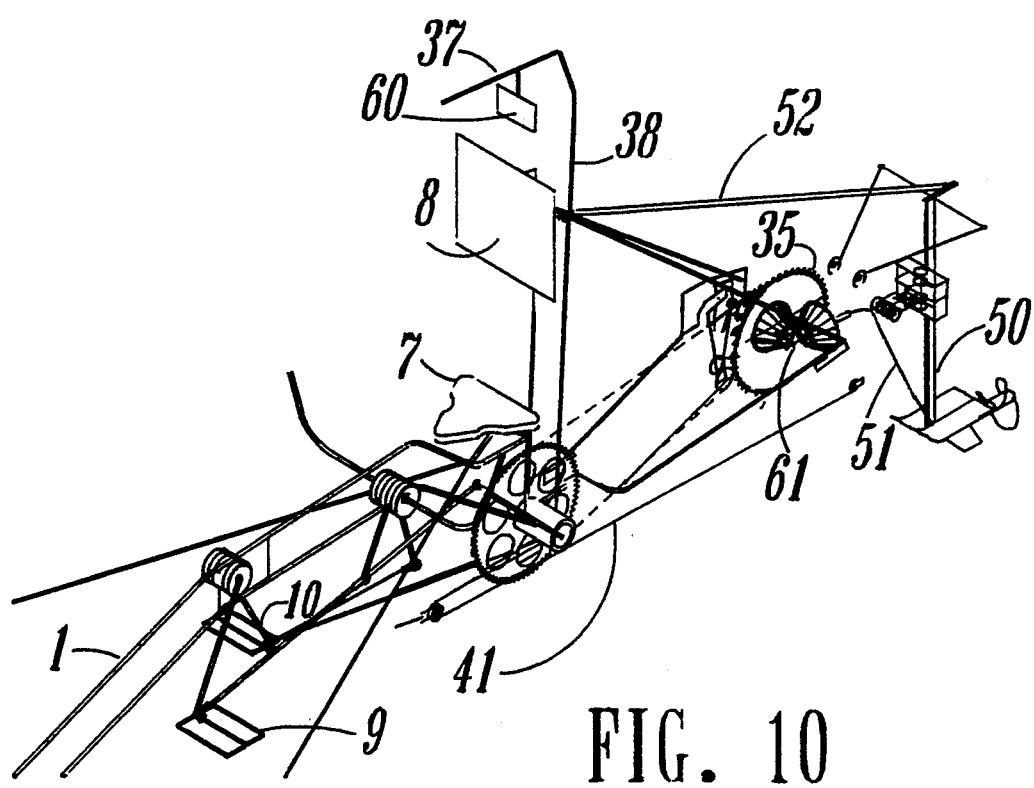
FIG. 10 is a perspective view of a drive mechanism that could be used with a water craft and with slight modification, an ultralight aircraft.

The second application for the present invention "Drive and Control Mechanisms For Human Powered Vehicles", is for water craft as shown in FIGS. 8-10. FIG. 8 shows a side view of a small boat 49 having a planing hull form with essentially the same drive and control mechanisms used with the velocipede except the wheels 2, 3, and 4 have been removed and the vertical steering rod 3S is only anchored in the bearing 40.

Components added to the water craft and enumerated in FIG. 8 are the boat hull 49, a simple stern drive 50, a flexible cable in housing torque drive 51, a trim control rod 52 for adjusting trim, a spring 59 for improving trim angle and a pressure plate 60 that can be pressed against by the operators head and helmet for adjustment of trim.

Figure 9A:
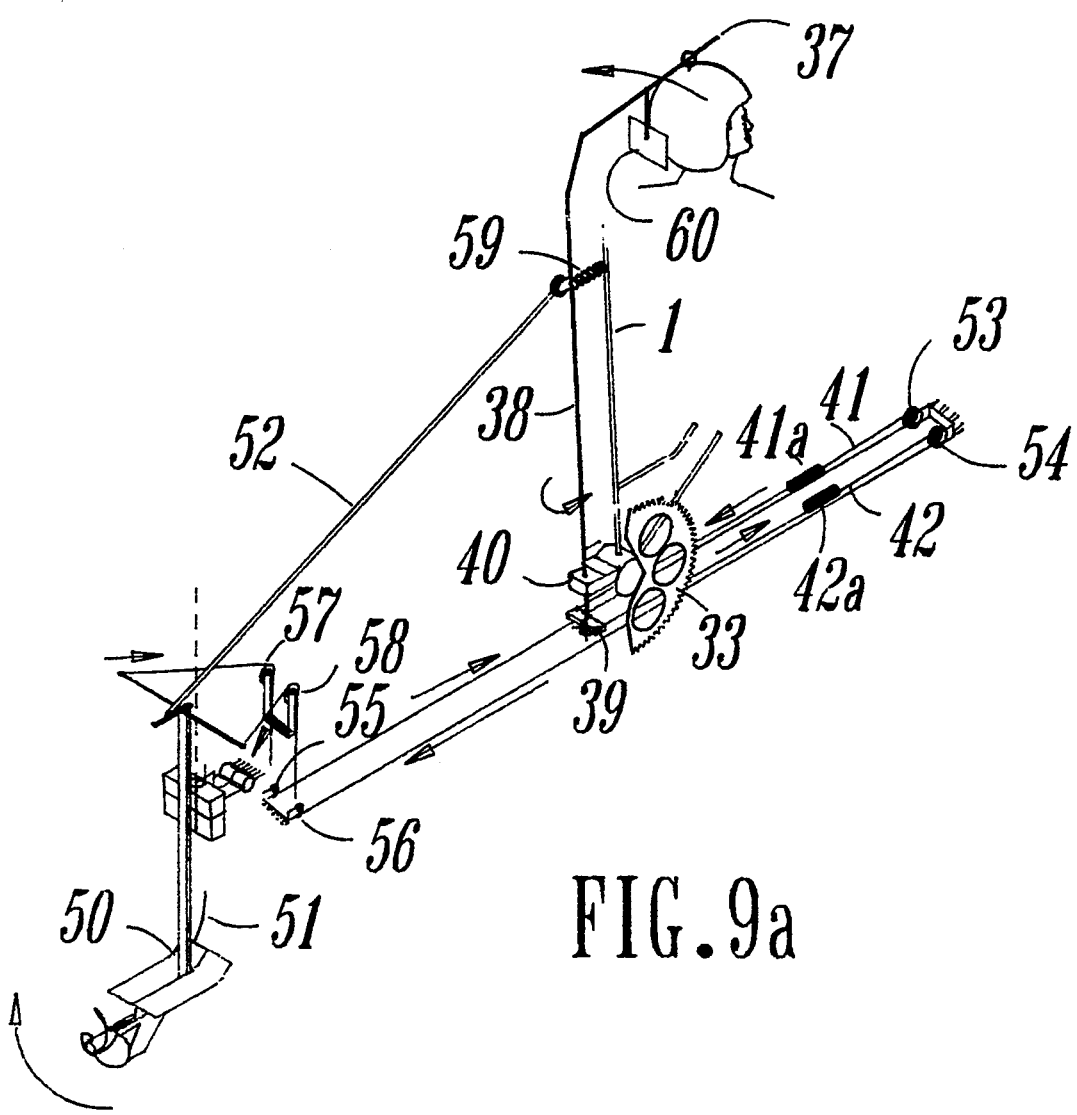
FIG. 9a is a perspective view of the control mechanisms for steering and trim adjustment as applied to a water craft showing the expected movement when the operator attempts a left turn.

Reference is made to FIGS. 9 and 9a which indicate how a water craft of this design is controlled. A turn to the right as shown in FIG. 9 is initiated by movement of the operator's head and helmet to the right (the helmet required for water craft is the simple design shown in FIG. 13). This movement is communicated to the steering lever 37 and then in the same manner as described for the velocipede communicates and translates the rotary arc motion to vector motion in the steering springs 41a and 42a and cables 41 and 42. A revision of the steering mechanism as compared to the velocipede was made to accomodate the need for a stern drive 50 or rudder to turn in a direction opposite from that of the operator's head movement in order to produce a turn in the same direction as said operator's head was leaned. The revision in the steering mechanism was accomplished by passing the steering cables 41 and 42 over one pulley each 53 and 54 resulting in a 180° change in direction. Therefore, if the motion of the right steering cable 42 is followed during a right hand turn the cable 42 is initially drawn to the rear, however, the same cable 42 passing around the pulley 54 is observed moving in a forward direction. Additional pulleys 56 and 58 for the right cable 42 and pulleys 55 and 57 for the left cable 41 direct each steering cable 41 and 42 over the transom of the boat 49 to connect with the stern drive 50 on their respective sides. If the right steering cable 42 is observed at the connection with the stern drive 50 it is observed moving forward effecting a pivoting motion of said sterndrive such that thrust generated by the water screw or water jet is to the right side resulting in a right turn. The left steering cable 41 moves in directions exactly opposite those described for the right steering cable 42 during a right hand turn.

FIG. 9a indicates expected motion of linkage 37, 38 and 39, steering springs 41a and 42a and cables 41 and 42 and the stern drive 50 in during a turn to the left.

The components necessary for adjusting the trim of the stern drive 50 are shown in FIGS. 8-10 and identified as the trim control rod 52, trim control spring 59 and pressure plate 60. When the operator wishes to trim the stern drive 50 down and therefore lower the bow of the boat 49 the helmet is pushed against pressure plate 60 which inturn pushes against the vertical steering rod 38 and the trim control rod 52 through which the vertical steering rod 38 rotatably passes. The trim control rod 52 then pushes in a rearward direction against the top of the stern drive 50 which results in a downward tuck of the bottom of the stern drive 50 toward the boat. Because the thrust produced by the stern drive 50 water screw naturally produces a trimmed down orientation at displacement speeds a trim control spring 59 serves to lessen the trim by pulling back against trim control rod 52.

The drive of the water craft application is operated in the same manner as the velocipede except the driving force generated by the operator is not delivered by a wheel on the ground but rather as shown in FIG. 10 through a set of right angle gears 61 of which one gear is affixed to the sprockets 35 and the other gear to a flexible cable in housing torque drive 51 which communicates with the stern drive 50 water screw. The water screw produces thrust which moves the boat 49 forward when as shown in FIG. 10 it turns in a counter clockwise direction.

Figure 11:
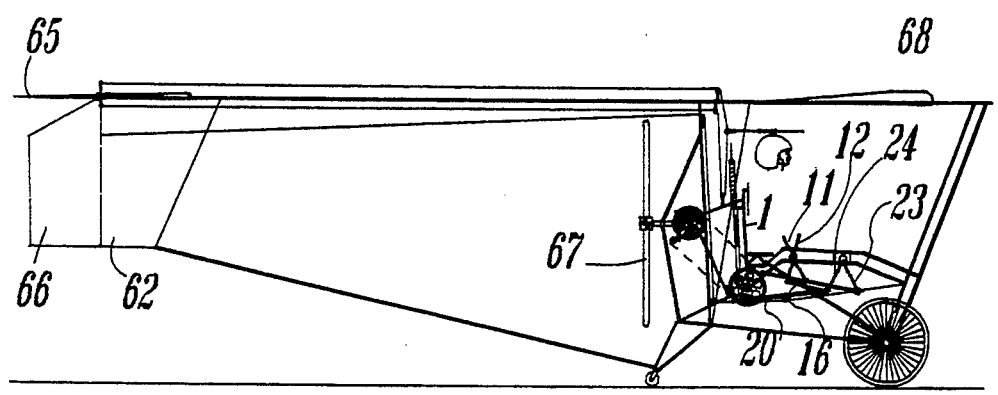
FIG. 11 is a side view of an aircraft using the drive and control mechanisms of this invention.
Figure 12:
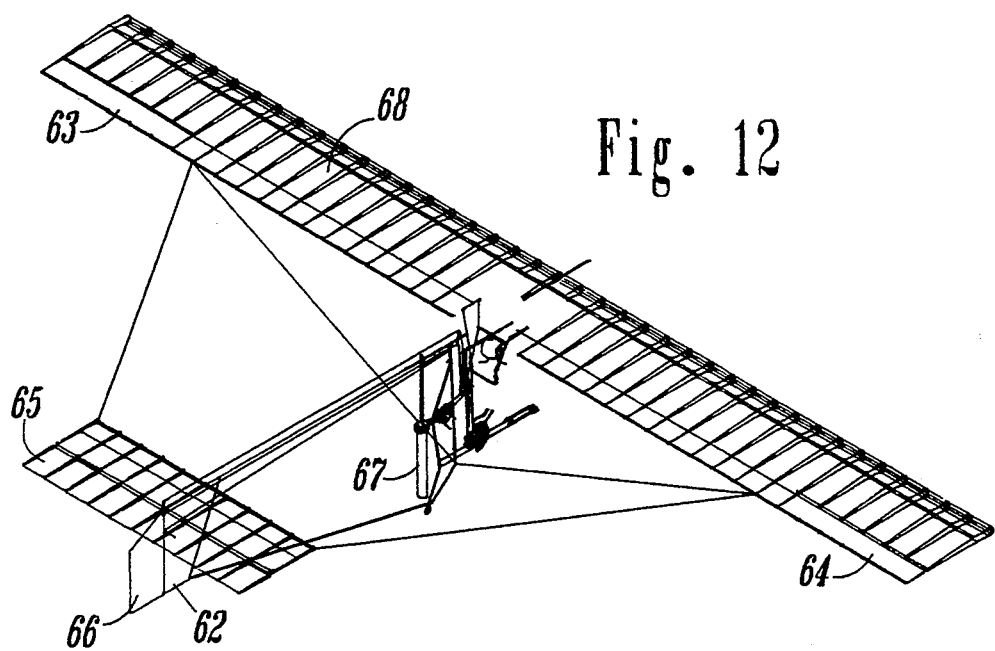
FIG. 12 is a perspective view of an aircraft which has had portions of the frame and drive edited out to aid the definition of the control mechanisms. The following 3 figures show the different aspects of the control mechanisms.
Figure 12A:
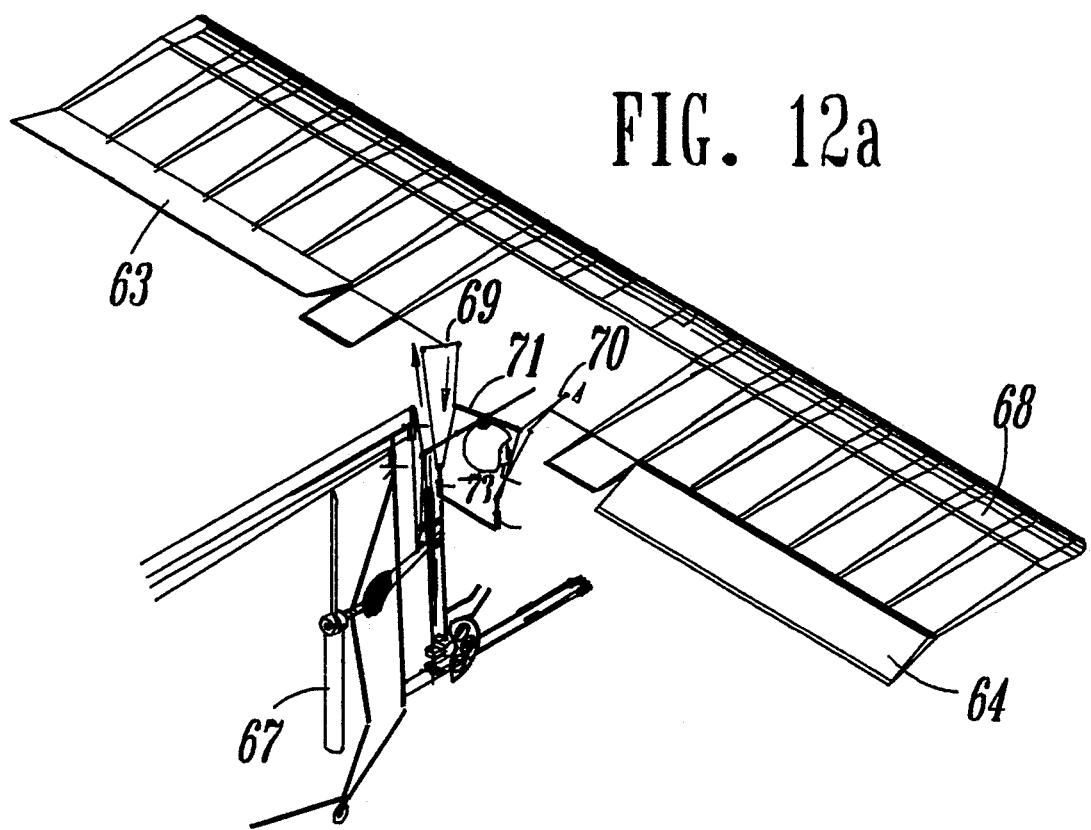
FIG. 12a is a perspective view of the control mechanisms used for the right and left ailerons. Portions of the aircraft were edited out to clarify visualization.

The last application for the present invention "Drive and Control Mechanisms For Human Powered Vehicles" is with ultra light aircraft. Application of the mechanisms are shown in FIGS. 11–12c. The current invention does not claim an aircraft design but does suggest drive and control mechanisms usable with aircraft. FIG. 11 shows a right hand side view of an ultra light aircraft incorporating the drive and control mechanism of the present invention. Components shown in this drawing which were not described earlier are the vertical stabilizer 62, the elevator 65, the rudder 66, the air screw 67 and the main lift wing 68.

Propulsion for the aircraft is gained in a manner very similar to the water craft except that the communication between the right angle gear set 61 and the air screw 67 is through a short rigid tube connection rather than a flexible drive.

Reference is made to FIG. 13 showing two(2) basic helmet configurations. One of the helmets is a simple configuration with only an "eyebolt" affixed and the other helmet has two components affixed. Control members 71 are attached to a bearing 72 which in turn is affixed to the helmet. The helmet with the control members 71 and bearing 72 is used for the ultra light aircraft design.

Reference is now made to FIG. 12 showing a perspective view of an aircraft having the components necessary to control flight. The components that are controlled by the operator's head are the left aileron 63, the right aileron 64, the elevator 65 and the rudder 66. To clarify presentation of the control mechanisms, portions of the frame 1 and drive components have been edited out of FIGS. 12, 12a, 12b and 12c. Function of the ailerons 63 and 64 are shown in FIG. 12a positioned such that the aircraft would be banking to the left. When the operator tilts his or her head to the left cables attached to the transverse component of the control members 71 respond. A cable connected to the top side of the left end of the control members 71 transverse component is pulled downward which in turn pulls down on the forward end of the left aileron control rod 69. Another cable is attached to the lower left end of the control members 71 transverse component which is given slack which is directed around a spring restricted pulley 73 and back upward to the rear end of the left aileron control rod 69 allowing it to rise relative to the pivot point in the center of said left aileron control rod 69. These movements result in the trailing edge of the left aileron 63 rising which while in motion deflects air upward pushing the left end of the primary lift wing 68 downward. Simultaneously, the right side of the operator's head is tilting upward. A cable attached to the upper right end of the control members 71 transverse component is given slack which allows the forward end of the right aileron control rod 70 which the other end of the cable is attached to rise relative to the pivot point at its center. At the same instant the rear end of the right aileron control rod 70 is being pulled downward by a cable affixed to it which is directed around a spring restricted pulley 74 and back upward to the lower right end of the control members 71 transverse component to which its other end is attached. The movement in the right aileron control rod 70 is communicated to and results in the trailing edge of the right aileron 64 dropping which while in motion deflects air downward and pushes the right end of the primary lift wing 68 upward. Banking to the right would result if all of the above conditions for banking left were reversed.

Figure 12B:
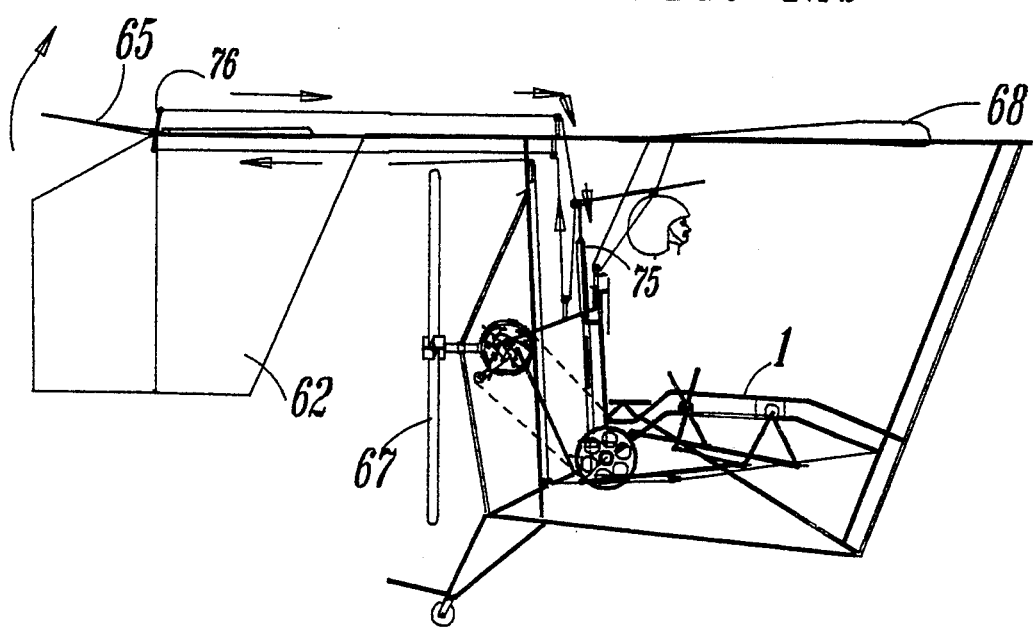
FIG. 12b is a side view of the mechanism for adjusting the aircraft elevator. Portions of the aircraft were edited out to clarify visualization.
Figure 12C:
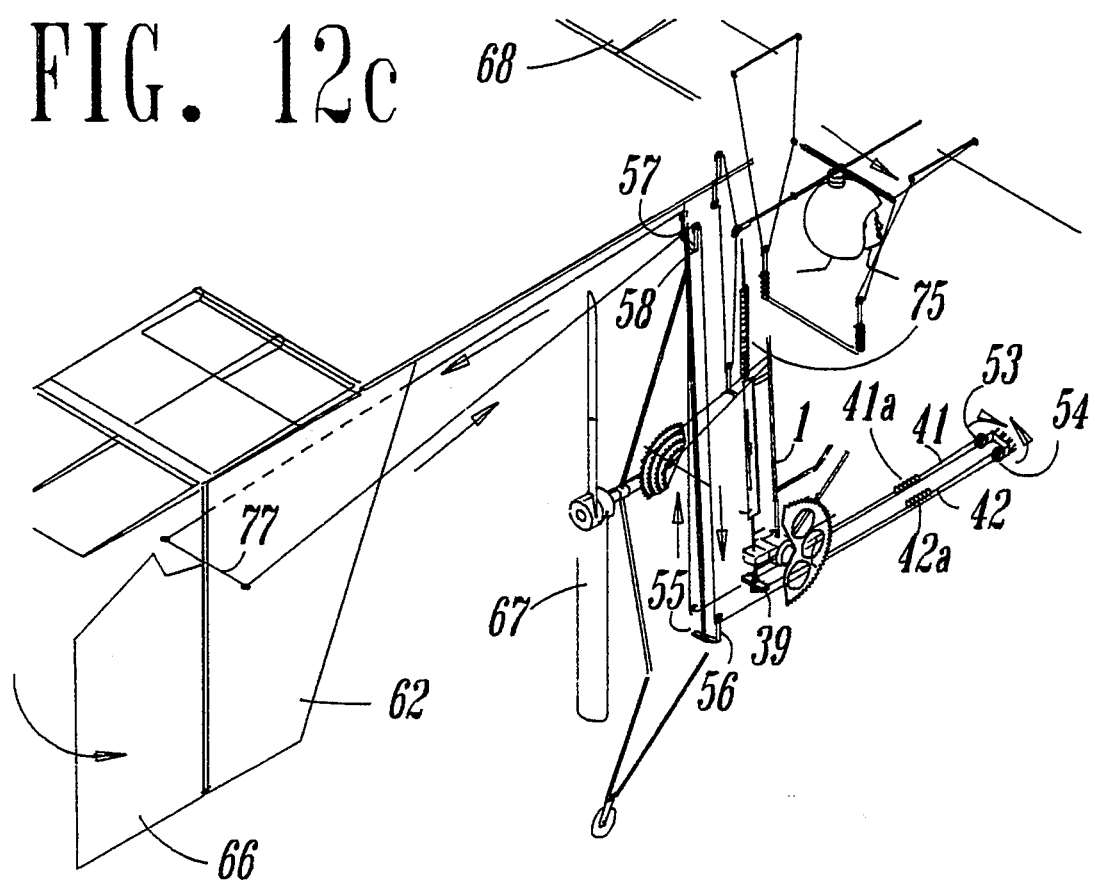
FIG. 12c is a perspective view of the rudder control mechanism which indicates the expected movement if the operator attempts to turn right.

Elevation is another necessary control parameter for aircraft that is highlighted in FIG. 12b. The steering lever 37 and the vertical steer rod 38 shown in FIGS. 1, 2, 5, 7, 8, 9, 9a and 10 were modified to conform to a telescoping linkage 75 that uses a combination tension and compression spring for returning the elevation controls to a neutral setting. FIG. 12 indicates the expected response when the operator tilts his or her head to look upward. The steering lever portion of the telescoping linkage 75 has an interlocking communication with the front to back component of the helmet control members 71 (shown clearly in FIG. 13) that responds to the operator's movement by dropping at the rear end when looking up. At the rear end of said steering lever portion are attached an upper and lower cable which are in communication with the elevator control rod 76 that is secured to the elevator 65 and pivots at its center. As the upper cable is pulled downward the tension is communicated 90° around a pulley to the upper end of the elevator control rod 76 pulling it forward and the lower cable is given slack that is communicated 180° around a lower pulley then 90° around a second pulley to the lower end of the elevator control rod 76. These movements result in the trailing edge of the elevator rising and while in motion would cause the front of the aircraft to turn upward. If the operator were to look downward while in motion the cable tension and slack would be reversed causing the trailing edge of the elevator to drop and thereby directing the front of the aircraft down.

The last control parameter is shown in FIG. 12c for the rudder 66. A turn to the right is initiated by movement of the operator's head and helmet to the right. This movement is communicated to the steering lever portion of the telescoping linkage 75 and then in the same manner as described for the velocipede communicates and translates the rotary arc motion to vector motion in the steering springs 41a and 42a and cables 41 and 42. A revision of the steering mechanism as compared to the velocipede was made to accomodate the need for a rudder 66 to turn in a direction opposite from that of the operator's head movement in order to produce a turn in the same direction as said operator's head was leaned or moved. The revision in the steering mechanism was accomplished by passing the steering cables 41 and 42 over one pulley each 53 and 54 resulting in a 180° change in direction. Therefore, if the motion of the right steering cable 42 is followed during a right hand turn the cable 42 is initially drawn to the rear, however, the same cable 42 passing around the pulley 54 is observed moving in a forward direction. Additional pulleys 56 and 58 for the right cable 42 and pulleys 55 and 57 for the left cable 41 direct each steering cable 41 and 42 over the top of the air screw 67 to connect with the rudder control rod 77 on their respective sides. If the right steering cable 42 is observed at the connection with the rudder control rod 77 it is observed moving forward effecting a pivoting motion of the rudder 66 such that thrust generated by the air screw and the air moving past the vertical stabilizer is directed to the right side resulting in a right turn. The left steering cable 41 moves in directions exactly opposite those described for the right steering cable 42 during a right hand turn. To effect a rudder turn to the left all operator, linkage and cable movement would be reversed from that described above.

An important aspect of these unique aircraft control mechanisms is that each control parameter can operate without affecting another or two can be operated simultaneously or all three control parameter can be operated in unison.

Another aspect that is vitally important for the operator of an aircraft is the ability to turn his or her head to look about. This is possible with the present invention because as shown in FIG. 13 the control members 71 are affixed to the top side of a bearing 72 which is in turn attached to the helmet. These features allow the operator's head to pivot in either direction without affecting the aircraft controls.

It should now be appreciated that the present invention discloses a novel means for propelling and controlling vehicles. This disclosure introduces a steering mechanism that can be used by most handicapped persons as well as individuals without disabilities. Motive force is generated by a natural extension and retraction of the limbs, not an unnatural circular motion. Use of this drive mechanism now represents a balanced exercise of the operator's upper body and legs which heretofore has rarely been accomplished. In addition to taking advantage of a recumbent position, the non-handicapped operator can add the push and pull strength of his or her arms to the motive force generated by his or her legs which results in the potential for greater speed and power than can be developed in other designs. The disclosed control mechanism provides a simple method for changing direction without impeding the operator's ability to provide motive force to the drive mechanism. An additional benefit of leaning the head and upper torso in the direction of the desired turn is a stabilizing change in the vehicle and rider's center of gravity.

Although the present invention has been described in some detail by way of illustration and example for purposes of clarity and understanding, it is understood that the application and exact configuration of the disclosure may be changed and modified within the spirit of the invention.

What is claimed is:

1. In a human powered vehicle including a steering system for regulating vehicle direction, a head actuated steering control apparatus comprising:
   a steering linkage assembly for controlling said steering system; and
   a head engaging member for enclosing an operator's head, said head engaging member including an actuating element for selectively linking said head engaging member and said steering linkage assembly in response to a tilting of said head engaging member, a linking of said head engaging member and said steering linkage assembly in response to the tilting of said head engaging member resulting in a change in said vehicle direction, said actuating element further preventing a linking of said head engaging member and said steering linkage assembly in response to a lateral, horizontal rotation of said head engaging member.

2. The head actuated steering control apparatus according to claim 1 wherein said steering linkage assembly includes a steering lever, and wherein said actuating element includes an aperture for receiving said steering lever therethrough, said aperture having an inner surface, said steering lever selectively engaging the inner surface of said aperture in response to a tilting of said head engaging member.

3. The head actuated steering control apparatus according to claim 1 wherein said actuating element includes:
   a first rigid member for selectively linking said head engaging member and said steering linkage assembly in response to a lateral tilting of said head engaging member;
   a second rigid member for selectively linking said head engaging member and said steering linkage assembly in response to a forwardly or rearwardly directed tilting of said head engaging member; and
   a pivotable member for pivotally mounting said first and second rigid members to said head engaging member.

4. A human powered vehicle comprising:
   a seating arrangement for positioning an operator of said human powered vehicle in a substantially recumbent orientation;
   a steering system for regulating vehicle direction;
   a steering linkage assembly for controlling said steering system; and
   a head actuated steering control apparatus for controlling said steering linkage assembly, said head actuated steering control apparatus including a head engaging member for enclosing the head of skid operator, said head engaging member further including an actuating element for selectively linking said head engaging member and said steering linkage assembly in response to a tilting of said head engaging member, a linking of said head engaging member and said steering linkage assembly in response to the tilting of said head engaging member resulting in a change in said vehicle direction, said actuating element further preventing a linking of said head engaging member and said steering linkage assembly in response to a lateral, horizontal rotation of said head engaging member.

5. The human powered vehicle according to claim 4 further comprising:
   an operator actuated drive mechanism for propelling said human powered vehicle, said drive mechanism including a pair of hand levers and a pair of foot pedals, said hand levers and foot pedals disposed forwardly of said seating arrangement and said head engaging member.

6. The human powered vehicle according to claim 4 wherein said steering linkage assembly includes a steering lever, and wherein said actuating element includes an aperture for receiving said steering lever therethrough, said aperture having an inner surface, said steering lever selectively engaging the inner surface of said aperture in response to a tilting of said head engaging member.

7. The human powered vehicle according to claim 4 wherein said actuating element further includes:
   a first rigid member for selectively linking said head engaging member and said steering linkage assembly in response to a lateral tilting of said head engaging member;
   a second rigid member for selectively linking said head engaging member and said steering linkage assembly in response to a forwardly or rearwardly directed tilting of said head engaging member; and
   a pivotable member for pivotally mounting said first and second rigid members to said head engaging member.

* * * * *